(12) United States Patent
Crompton et al.

(10) Patent No.: US 9,920,866 B2
(45) Date of Patent: Mar. 20, 2018

(54) HYBRID PUSH-TO-CONNECT FITTING, DEVICE AND ASSEMBLY

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/612,394

(22) Filed: Jun. 2, 2017

(65) Prior Publication Data

US 2018/0031156 A1 Feb. 1, 2018

Related U.S. Application Data

(63) Continuation of application No. 15/220,446, filed on Jul. 27, 2016, now Pat. No. 9,671,049.

(51) Int. Cl.
| | |
|---|---|
| *F16L 19/06* | (2006.01) |
| *F16L 19/07* | (2006.01) |
| *F16L 21/00* | (2006.01) |
| *F16L 19/065* | (2006.01) |

(52) U.S. Cl.
CPC .............. *F16L 19/07* (2013.01); *F16L 19/065* (2013.01); *F16L 21/007* (2013.01)

(58) Field of Classification Search
CPC .............................. F16L 37/091; F16L 37/0915
USPC .......... 285/340, 343, 354, 39, 342, 104, 314
See application file for complete search history.

(56) References Cited

U.S. PATENT DOCUMENTS

| | | | | |
|---|---|---|---|---|
| 1,927,390 | A * | 9/1933 | Church ................. | F16L 19/075 277/322 |
| 2,452,275 | A * | 10/1948 | Woodling ............. | F16L 19/065 285/341 |
| 3,265,412 | A * | 8/1966 | Reid ....................... | F16L 19/08 285/323 |
| 3,312,484 | A * | 4/1967 | Davenport ............ | F16L 19/086 285/340 |
| 3,633,944 | A * | 1/1972 | Hamburg .............. | F16L 17/035 285/111 |
| 3,659,881 | A * | 5/1972 | Tinsley .................. | F16L 41/02 285/249 |
| 4,000,919 | A * | 1/1977 | Edwards ............... | F16L 37/091 285/111 |
| 4,627,644 | A * | 12/1986 | Ekman .................. | F16L 33/227 285/24 |
| 6,450,550 | B1 * | 9/2002 | Cornwell ............. | F16L 19/0283 285/340 |
| 7,350,831 | B2 * | 4/2008 | Shimizu .............. | F16L 19/0231 285/334.5 |
| 8,272,671 | B2 * | 9/2012 | Becker .................... | F16L 19/10 285/249 |
| 9,562,637 | B1 * | 2/2017 | Crompton ............. | F16L 21/007 |

(Continued)

*Primary Examiner* — Aaron M Dunwoody
(74) *Attorney, Agent, or Firm* — Williams Mullen; Thomas F. Bergert

(57) ABSTRACT

A fitting device includes a fitting body having an interior surface defining an interior, a packing assembly maintained within the fitting body interior, a retaining nut, and a shoe member maintained between the retaining nut and the axially outer rim of the fitting body, whereupon inserted tubes or pipes can be securely inserted into the fitting interior and maintained therein.

10 Claims, 16 Drawing Sheets

(56) References Cited

U.S. PATENT DOCUMENTS

| | | | | |
|---|---|---|---|---|
| 2004/0255608 A1* | 12/2004 | Hector | ............... | F16L 19/065 62/474 |
| 2005/0194785 A1* | 9/2005 | Shemtov | ............ | F16L 19/0212 285/382.7 |
| 2010/0164222 A1* | 7/2010 | Schreckenberg | ... | F16L 37/0925 285/24 |
| 2010/0314863 A1* | 12/2010 | Ohara | ................. | F16L 37/091 285/31 |
| 2013/0168959 A1* | 7/2013 | Turk | ................. | F16L 19/061 285/342 |
| 2013/0200607 A1* | 8/2013 | Rodenberg | ......... | F16L 37/0915 285/82 |
| 2015/0152986 A1* | 6/2015 | Taylor | ................. | F16L 37/091 285/332.2 |
| 2016/0230911 A1* | 8/2016 | Taylor | ................. | F16L 19/061 |
| 2017/0002962 A1* | 1/2017 | Corne | ................. | F16L 19/075 |

* cited by examiner

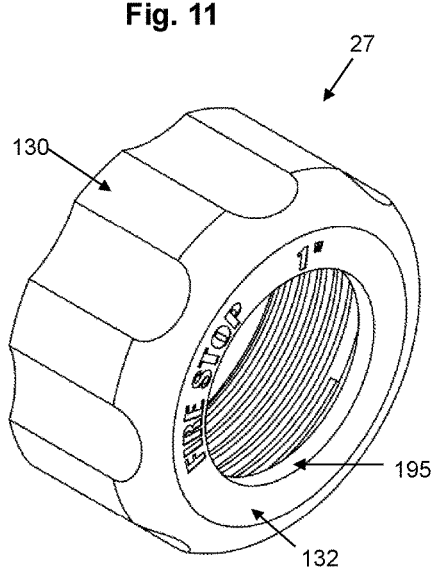
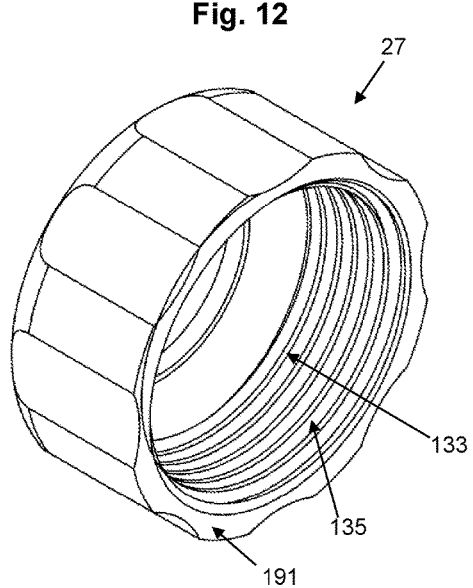
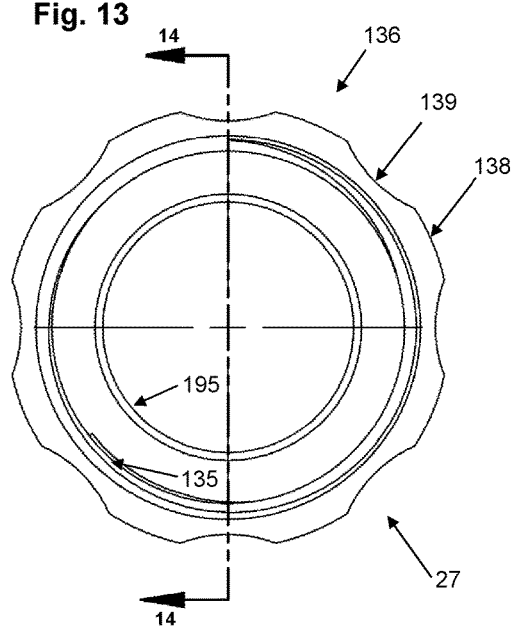
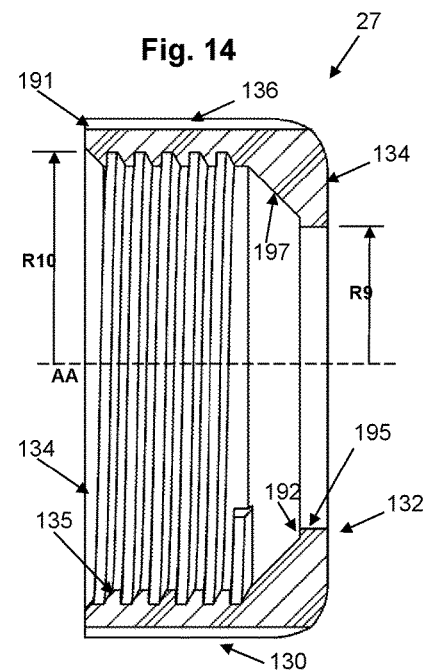

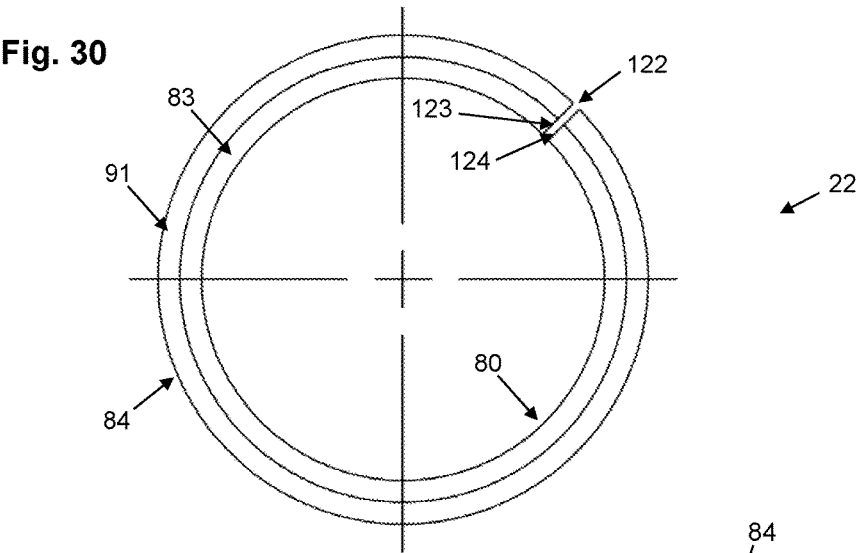
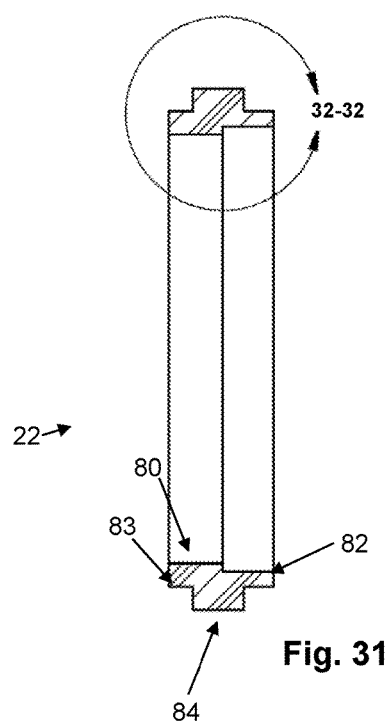
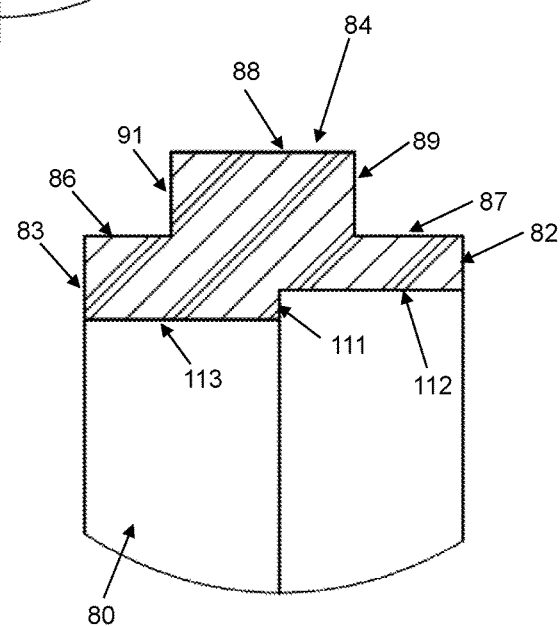
Fig. 30
Fig. 31
Fig. 32

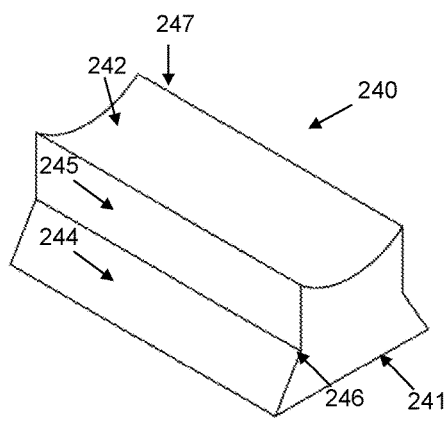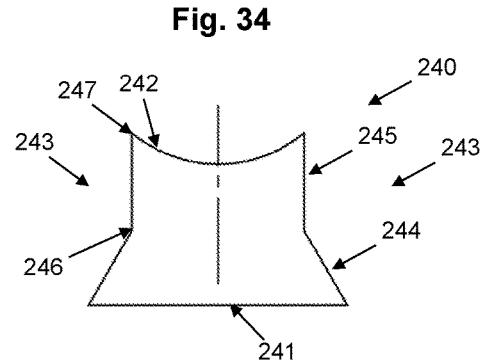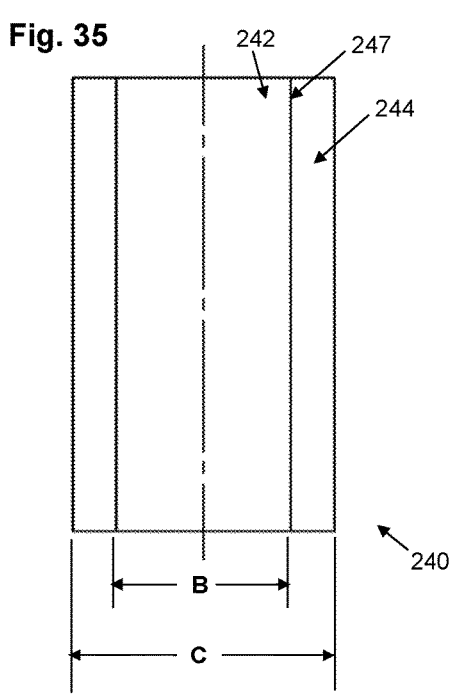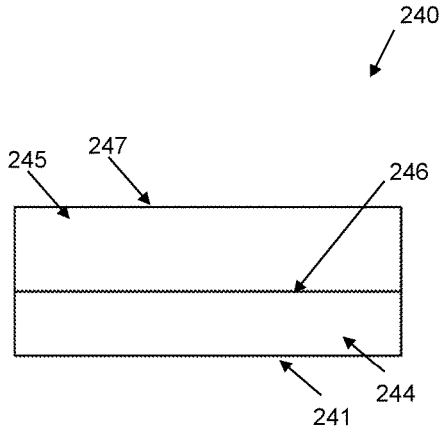
Fig. 33
Fig. 34
Fig. 35
Fig. 36

HYBRID PUSH-TO-CONNECT FITTING, DEVICE AND ASSEMBLY

FIELD OF THE INVENTION

The present invention relates to piping conduits, and more particularly to a hybrid push-to-connect fitting device, arrangement and method that facilitates protection of contents.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the terms "pipe", "piping", "tube" or "tubing" will be understood to encompass one or more pipes, tubes, piping elements and/or tubing elements, and may be used interchangeably.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems, and particularly with plumbing systems, to reduce the dangers and time involved in soldering joints and other connection methods. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology. The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™ CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122, U.S. Pat. No. 8,480,134, U.S. Pat. No. 8,844,974, U.S. Pat. No. 8,844,981, U.S. Pat. No. 9,068,680, and U.S. Pat. No. 9,217,529, the disclosures of which are incorporated herein by reference in their entireties.

Among other specific issues, push fitting technologies generally have no stopping force for resisting or preventing the rotation of the fitting about an inserted tubing element. In various applications, including with plastic applications such as CPVC materials, it is desirable to prevent the fitting from rotating about the inserted tubing element for stability, strength, durability and overall operation. Further, such operational attributes facilitate application of the embodiments of the device of the present invention in fire suppression.

SUMMARY OF ASPECTS OF THE PRESENT INVENTION

In various embodiments of the present invention, one or more sealing member gasket inserts (e.g., O-ring members) fit within a first sealing ring compartment defined in the interior wall of the fitting body. In addition, at each pipe receiving end of the fitting body, a second compartment is machined into the interior wall to retain a fastening ring, retaining ring and lead portion of a release pusher. The second compartment can include a radially extending slot for receiving the radially outer fin of the retaining ring. An o-ring retainer is positioned between the fastening ring and o-rings, resting partly within the first compartment and partly within the second compartment. The release pusher includes a head portion and a body portion, with the body portion having one or more cavities formed therein for receiving a shoe that extends around the circumference of an inserted pipe. The radially outer end of the shoe rests between the axially outer end of the fitting body and the inner surface of the nut connector. The radially inner end of the shoe includes one or more heel members that engage the one or more cavities of the release pusher, helping prevent rotation of the release pusher should an inserted pipe rotate undesirably during an application.

In various embodiments, the nut connector is employed to provide additional support for the fastening ring and to cooperate with the release pusher to facilitate connection and disconnection of piping elements while resisting up to thirty foot-pounds of rotational torque. The nut connector member further maintains the shoe, retaining ring, fastening ring and o-ring retainer in place against elements of the fitting inner wall.

Aspects of the present invention provide a novel hybrid push-to-connect fitting joint packaging arrangement comprising a fastening ring having one or more prolated ear members, at least one o-ring member, an o-ring support member, a split retaining ring, a release pusher, a shoe member and a threaded retaining cap.

The release pusher provided as part of embodiments of the present invention is employed to facilitate the release of tubing, piping and other cylindrical objects inserted into a fitting. The release pusher is manually pushed into the cavity formed by the tube support member within the fitting body and tapered edges of the release pusher generally or nearly abut the installed fastening ring. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed.

In various embodiments, a device according to the present invention includes a fitting body having an interior surface with a tube stop extending radially inwardly thereof, and one or more nut connector assemblies provided as part of a packing arrangement comprising at least one sealing ring, an o-ring retainer, a split retaining ring and a fastening ring. The packing arrangement can further include a release pusher positioned on the radially inward side of the nut connector, wherein the release pusher is capable of axial insertion into the cavity of the head connector in order to lift teeth of the grip ring radially outwardly to permit insertion and removal of tubes to be connected via the fitting body. In various embodiments of the present invention, the release pusher is permanently secured to the fitting and is part of the packing arrangement. The release pusher can also be provided with a body portion having one or more axially extending openings for receiving a shoe member. The shoe member rests between the fitting body and the nut connector.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. The interior compartments and packing arrangements provide integrated support for the sealing members and fastening ring when opposing force is applied to piping elements that have been inserted into the coupling arrangement. The present invention can be applied in heating, ventilation and air conditioning (HVAC) environments, among many others.

Other methods, devices and arrangements as described herein are provided by the present invention.

BRIEF DESCRIPTION OF THE DRAWINGS

FIG. 11 is a front right perspective view of a nut connector in accordance with embodiments of the present invention.

FIG. 12 is a rear right perspective view of a nut connector in accordance with embodiments of the present invention.

FIG. 13 is a right side view of the nut connector of FIG. 12.

FIG. 14 is a cross-sectional view of the nut connector as taken along line 14-14 of FIG. 13.

FIG. 30 is a right side view of a spacer gland in accordance with embodiments of the present invention.

FIG. 31 is a front cross-sectional view of the spacer gland of FIG. 30.

FIG. 32 is an enlarged view of the portion of the spacer gland taken from encircled portion 32-32 of FIG. 31.

FIG. 33 is a front right perspective view of an anti-rotational jaw member in accordance with embodiments of the present invention.

FIG. 34 is a right side view of the jaw member of FIG. 33.

FIG. 35 is a top plan view of the jaw member of FIG. 33.

FIG. 36 is a front elevation view of the jaw member of FIG. 33.

DETAILED DESCRIPTION OF THE PREFERRED EMBODIMENTS

Figure 1:
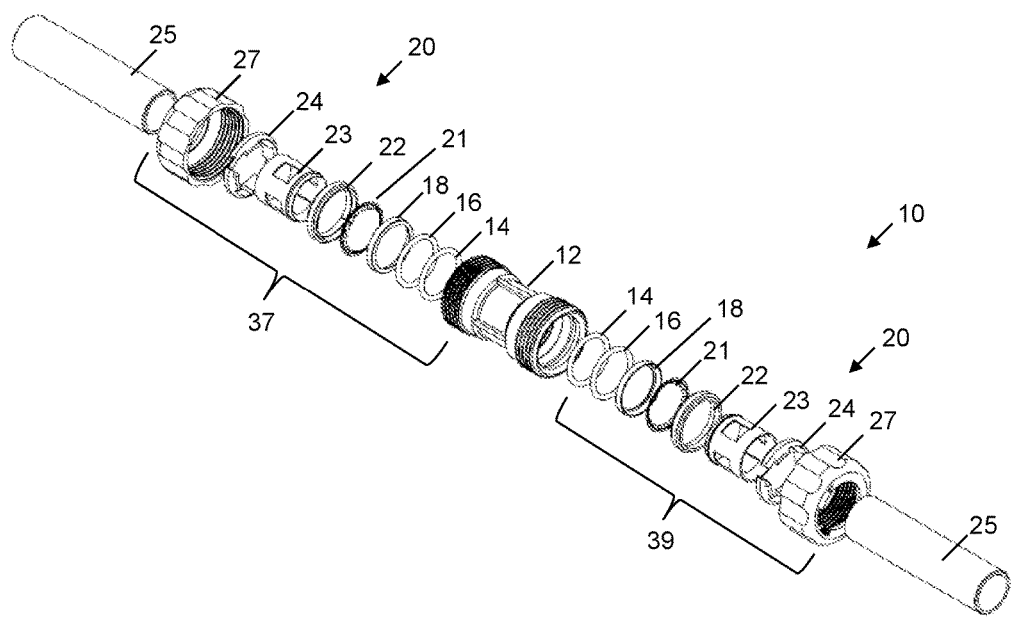
FIG. 1 is an exploded front perspective view of a device in accordance with embodiments of the present invention.
Figure 2:
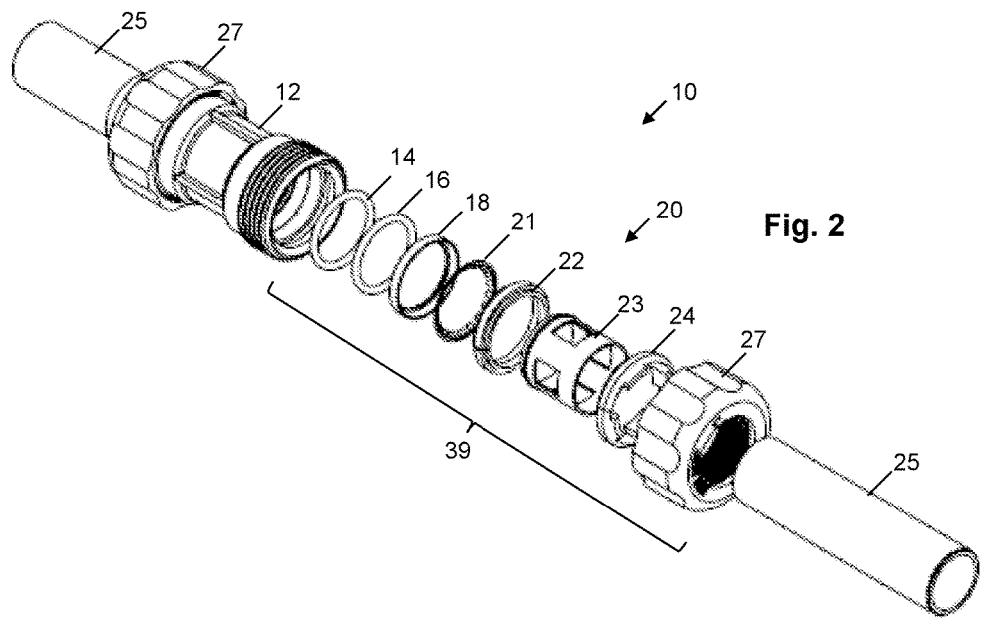
FIG. 2 is an exploded front perspective view of a device with an installed packing arrangement on one side of the center body in accordance with embodiments of the present invention.
Figure 3:
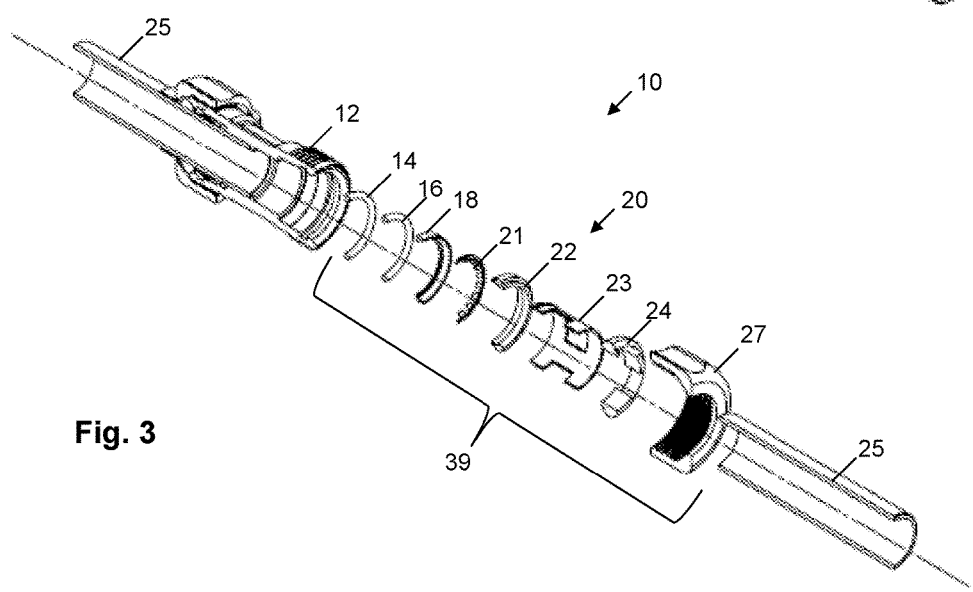
FIG. 3 is a cross-sectional view of the device of FIG. 2.
Figure 4:
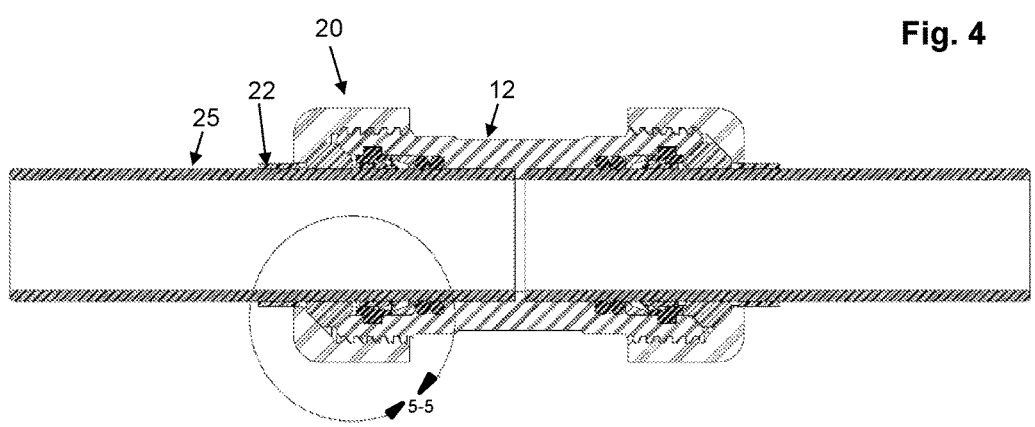
FIG. 4 is a front cross-sectional view of one embodiment of the device of the present invention.

In the device 10 of embodiments of the present invention as shown in FIGS. 1 through 30, elements of the device 10 as shown include: a fitting body member 12 having one or more packing arrangements 37, 39, with each packing arrangement including all or a portion of: one or more sealing rings 14, 16, a sealing ring support member 18, a fastening ring 21, a retaining ring 22, a release pusher 23, a shoe member 24 and a nut connector 27. In various embodiments, the packing arrangement comprises one or more sealing rings 14, 16, a sealing ring support member 18, fastening ring 21, retaining ring 22 and release pusher 23 within the interior of the fitting body member 12. As shown in FIGS. 1 through 6, nut connector 27 is secured to the exterior surface 15 of the fitting body member 12, and shoe member 24 is secured between the body member 12 and the nut connector 27. When installed, each packing arrangement 37, 39 facilitates insertion of a pipe member 25 into the body member 12 and secure retention thereof. The packing arrangements further provide resistance to and/or prevent rotation of an inserted pipe. FIGS. 1 through 4 show two tubes or pipe members 25 connected or being connected to respective packing arrangements using the device 10.

Figure 7:
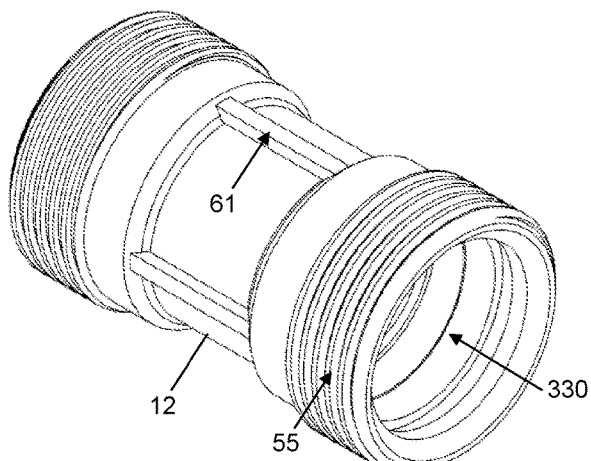
FIG. 7 is a perspective view of a fitting body in accordance with embodiments of the present invention.
Figure 8:
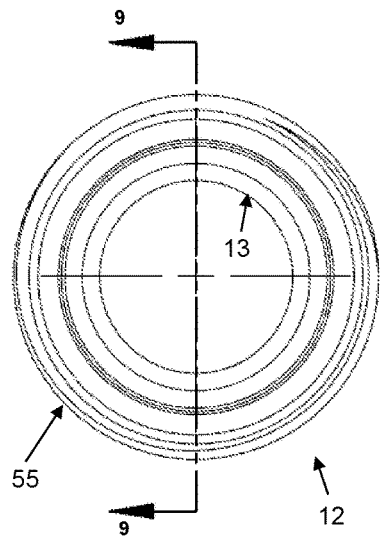
FIG. 8 is a right side view of the fitting body of FIG. 7.
Figure 9:
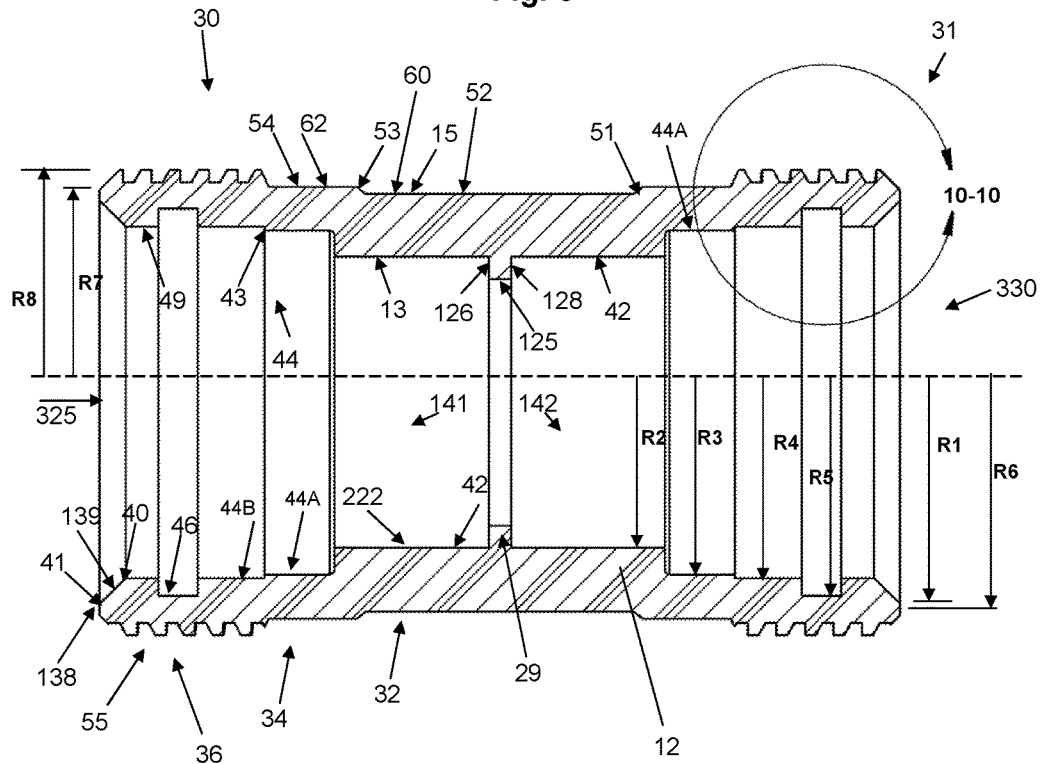
FIG. 9 is a cross-sectional view of the fitting body as taken along line 9-9 of FIG. 8.

In various embodiments, the fitting body member 12 is a substantially cylindrical body having an exterior surface 15, and an interior surface 13 having a tube stop 29 extending radially inwardly thereof. As shown in FIG. 7, the exterior surface 15 can include one or more ramparts 61 to facilitate engagement by an external tool (not shown) when rotating the fitting body 12 or otherwise manipulating the device. The tube stop 29 effectively divides the fitting interior 13 into first 141 and second 142 interior wall portions, and the tube stop element includes first 126 and second 128 radially extending edges, and an axially extending surface 125. The edges 126, 128 act to stop the axial insertion of tubes during operation of the present invention, and surface 125 is generally axially aligned with the internal surfaces of inserted tubes to facilitate smooth movement of any materials or fluids inside of the tubes, for example. The interior surface 222 forms a cavity 330 extending axially through the fitting body member 12 along axis 325, as shown in FIG. 9. In various embodiments, the fitting body member 12 can be forged CW617N brass, with full porting and full flow fitting, for example. In other embodiments, the fitting body member 12 can be a plastic material, such as polyvinyl chloride (PVC) or chlorinated polyvinyl chloride (CPVC), for example.

Figure 10:
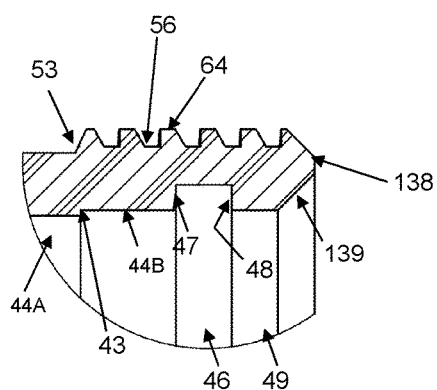
FIG. 10 is an enlarged view of the portion of the device taken from encircled portion 10-10 of FIG. 9.

As shown in FIGS. 7 through 10, the fitting body member 12 is substantially cylindrical and includes first 30 and second 31 segments, divided by a tube stop 29. The first 30 and second 31 segments are integrally formed, such that the fitting body member 12 is a monolithic device. Each of the first 30 and second 31 segments includes an axially inner portion 32, an axially intermediate portion 34 and an axially outer portion 36, with the axially inner portion 32, axially intermediate portion 34 and axially outer portion 36 being integrally formed and each having a respective interior wall surface 42, 44, 46/49, exterior wall surface 52, 54, 55, interior radius R2, R3 and/or R4, R5 and an exterior radius R6, R7, R8, wherein the exterior radius R7 of the axially intermediate portion 34 is larger than the exterior radius R6 of the axially inner portion 32, and wherein the exterior radius R8 of the axially outer portion 36 is larger than the exterior radius R6 of the axially inner portion 32 and the exterior radius R7 of the axially intermediate portion 34. In this way, and among other things, the present invention provides a greater sized opening at the pipe or tubing entry area on the fitting body 12 and a tighter opening within the axially inner portion 32. As shown in FIG. 9, a first ridge 53 extends radially outwardly from the outer wall 15 from a wall segment 60 forming a boundary for the axially inner portion 32 to a wall segment 62 forming a boundary for the axially intermediate portion 34. The exterior wall surface 55 of the axially outer portion 36 can include a radially outwardly extending thread 64 along a portion or all of the surface 55. The axially outer portion 36 can include a recessed interior wall portion 46 and an unrecessed portion 49, wherein recessed portion 46 includes side wall 47 and side wall 48, as shown in FIG. 10.

As further shown in FIGS. 9 and 10, the axially outer portion 36 of the first 30 and second 31 segments terminates in an axially outer rim 138. In various embodiments, the axially outer rim 138 has an internal radius R1 that is substantially the same as the axially intermediate portion internal radius R3 or R4. In various other embodiments, the axially outer rim 138 is sloped such that the radius varies from a shorter size at the axially inner edge 40 to a longer size at the axially outer edge 41 of the radially inner edge 139 of the axially outer rim 138. In this way, the opening formed by the inner edge 139 is adapted to receive the shoe member 24 as described elsewhere herein.

As further shown in FIGS. 9 and 10, the interior radius R3 or R4 of the axially intermediate portion 34 is larger than the interior radius R2 of the axially inner portion 32, and the interior radius R5 of the axially outer portion 36 is larger than the interior radius R2 of the axially inner portion 32 and the interior radius R3 or R4 of the axially intermediate portion 34. Additionally, the axially intermediate portion 34 can be provided with a radial step 43 extending radially inwardly such that the axially intermediate portion 34 includes a first interior wall portion 44A having an internal radius R3 and a second interior wall portion 44B having an internal radius R4, where the portions 44A and 44B are separated by the radial step 43. As described elsewhere herein, the radial step 43 assists in providing an engaging surface for the sealing ring support member 18 as part of the packing arrangement provided in accordance with aspects of the present invention.

Figure 5:
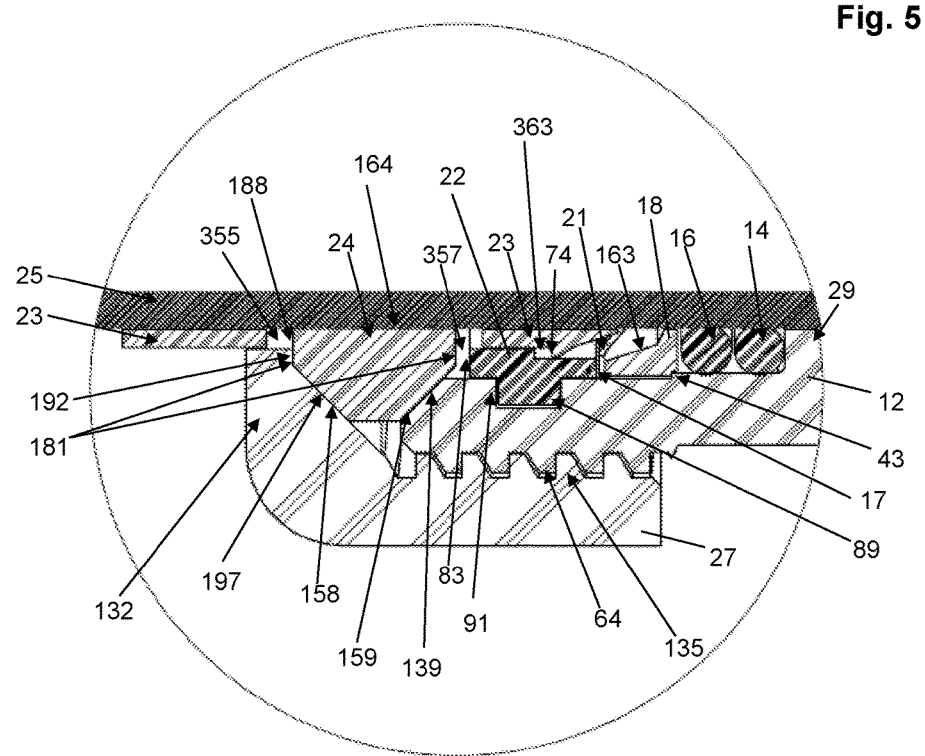
FIG. 5 is an enlarged view of the portion of the device taken from encircled portion 5-5 of FIG. 4.
Figure 6:
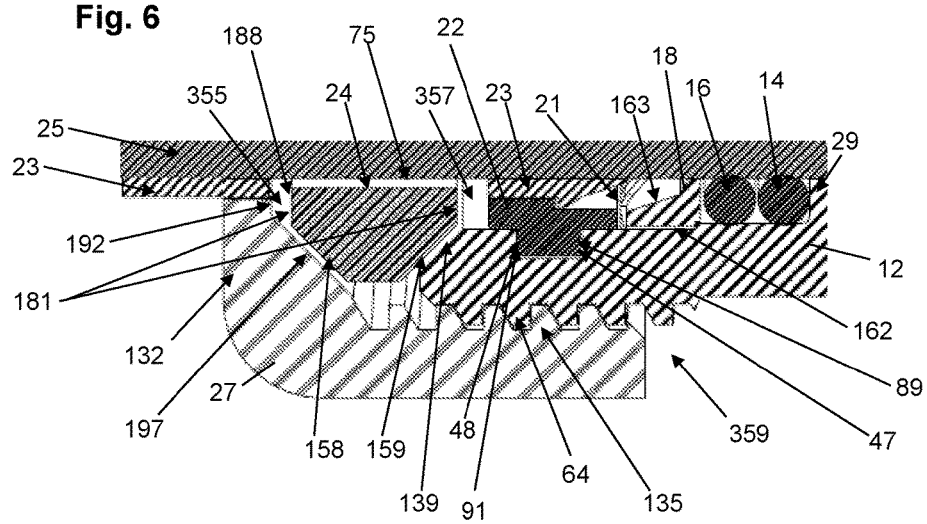
FIG. 6 is a view similar to FIG. 5 at a different stage of engagement from the device in FIG. 5.

As shown in FIGS. 5 and 6, sealing rings 14, 16 are maintained against stop 29 and within the first interior wall portion 44A of the axially intermediate portion 34 of the fitting body member 12, and the sealing ring support member 18 is maintained partially within the first interior wall portion 44A and partially within the second interior wall portion 44B of the axially intermediate portion 34 of the fitting body member 12. In various embodiments, the sealing members 14, 16 can be lubricated with a food grade lubricant, for example. It will be appreciated that the sealing members 14, 16 can comprise a flat ring or washer-type seal member that can be formed of EPDM rubber, for example.

In various embodiments, the sealing rings are ring-shaped members of substantially circular cross-section.

Figure 28:
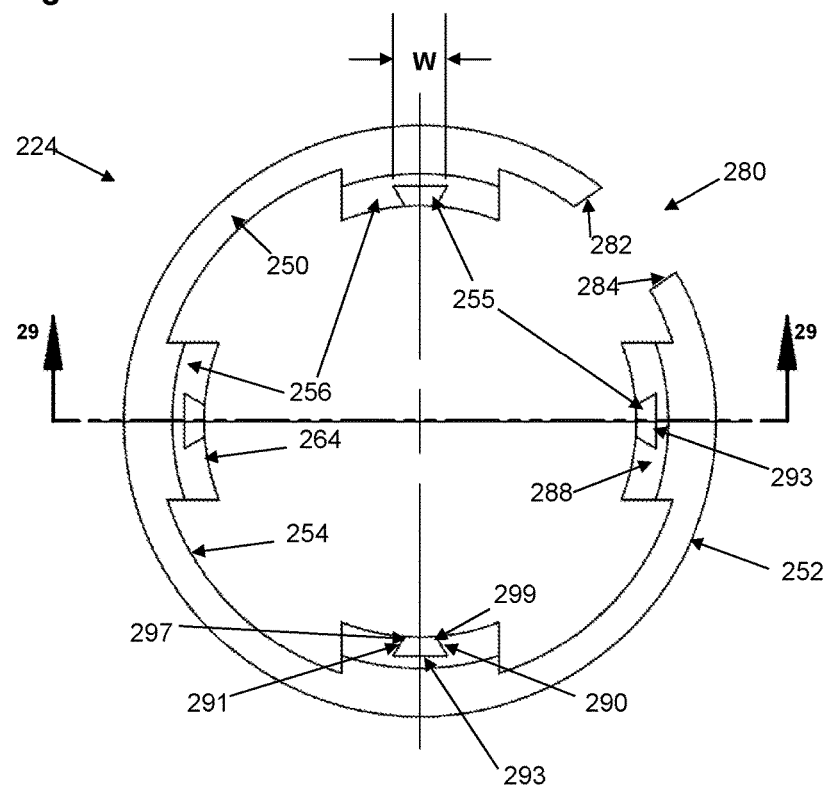
FIG. 28 is a right side view of a lock washer in accordance with additional embodiments of the present invention.
Figure 29:
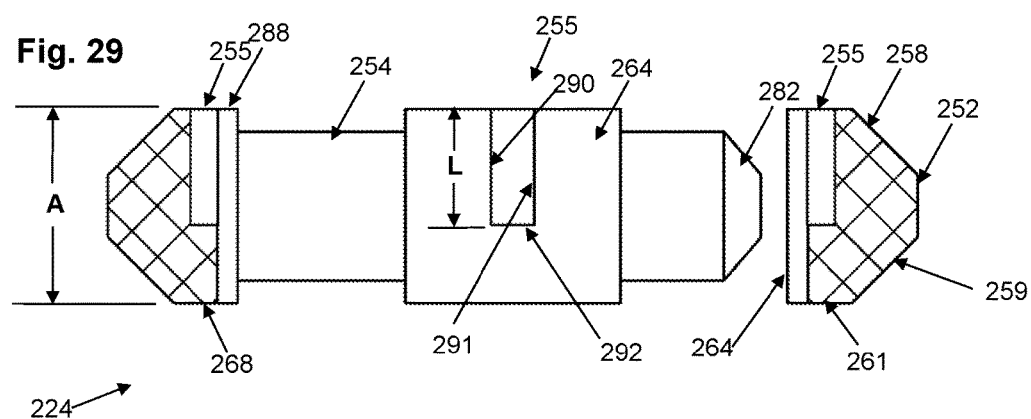
FIG. 29 is a cross-sectional view of the lock washer of FIG. 28, taken along the line 29-29 of FIG. 28.

As shown in FIGS. 5 and 6, for example, the retaining ring 22 is substantially cylindrical and is partially maintained within the interior wall 46 of the axially outer portion 36 of the fitting body member 12 and partially maintained within the second interior wall portion 44B of the axially intermediate portion 34 of the fitting body member 12. As shown in FIGS. 28 through 30, the retaining ring 22 has a radially interior surface 80, against which the release pusher 23 is slidably maintained during operation. The retaining ring 22 includes an axially inner edge 82, an axially outer edge 83, a retaining lip 111, an axially inner wall segment 112 as part of the radially interior surface 80, and an axially outer wall segment 113 as part of the radially interior surface 80. The retaining ring 22 further includes a radially outer surface 84 comprising an axially inner segment 87, an axially intermediate segment 88 and an axially outer segment 86. As shown in FIGS. 30 through 32, the axially intermediate segment 88 extends radially outward further than the radial outward extension of the axially inner 87 and outer 86 segments. Further, the axially inner segment 87 extends radially outward substantially the same distance as the radial outward extension of the axially outer segment 86. In this way, the outer surface 84 can substantially mate with the inner surface 13 of the fitting body member 12, as the axially outer segment 86 lies in substantially flush engagement with the interior surface 49 of the axially outer portion 36 of the fitting body member 12, the axially intermediate segment 88 lies in substantially flush engagement with the interior wall 46 of the axially outer portion 36 of the fitting, and the axially inner segment 87 lies in substantially flush engagement with the interior wall portion 44B of the axially intermediate portion 34 of the fitting body member 12, as shown in FIGS. 5, 6, 9 and 10. The retaining ring 22 further includes a first wall member 89 extending from the axially inner segment 87 to the axially intermediate segment 88, and a second wall member 91 extending from the axially outer segment 86 to the axially intermediate segment 88. As shown in FIGS. 5 and 6, first wall member 89 engages side wall 47 of the interior wall 46 of the axially outer portion 36 of the fitting body member 12, and second wall member 91 engages side wall 48 of the interior wall 46 when installed. In embodiments of the present invention, the retaining ring 22 can comprise a spring steel formulation, and can be provided as a unitary, unsplit member or can be provided with a split similar to the embodiment of the fastening ring described elsewhere herein. For example, as shown in FIG. 29, retaining ring 22 is formed with a split 122 exposing first 123 and second 124 opposing circumferential end edges. The split 122 can facilitate insertion and removal of the retaining ring during assembly. No wrenches, solder, welding, glue and/or twisting and turning the elements are required to form or disengage a connection.

As shown in FIGS. 5, 6 and 18 through 20, a fastening ring 21 is maintained within the second interior wall portion 44B of the axially intermediate portion 34 of the fitting body member 12, with the fastening ring base 17 having a radially outer edge 177 and being held between an axially inner edge 82 of the tube support member 22 and an axially outer edge 160 of the sealing ring support member 18. The fastening ring 21, which can be an integral, unsplit ring or can be a split ring member. In the embodiments where the fastening ring is a split ring, the fastening ring can include two circumferential end points (not shown) that do not connect, with fixture points for handling and compressing the fastening ring, such that a tool designed to hold the fastening ring at the fixture points can more easily handle and compress the fastening ring in order to assist with assembly or disassembly of embodiments of the present invention. In this embodiment, and once compressed, the fastening ring is easily insertable into the fitting body member 12 by releasing the hold on the fixture points, thereby allowing the fastening ring to expand such that the circumferential base engages the walls of the second radial housing element. The fastening can be removed from the second radial housing element in similar manner. No wrenches, solder, welding, glue and/or twisting and turning the elements are required to form or disengage a connection.

Figure 18:
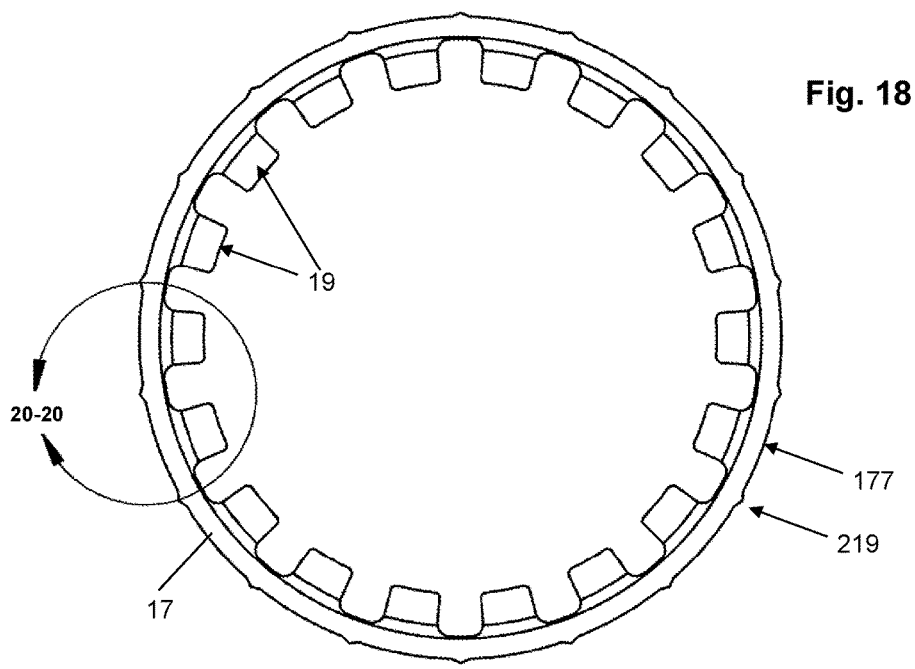
FIG. 18 is a right side view of a fastening ring in accordance with embodiments of the present invention.
Figure 19:
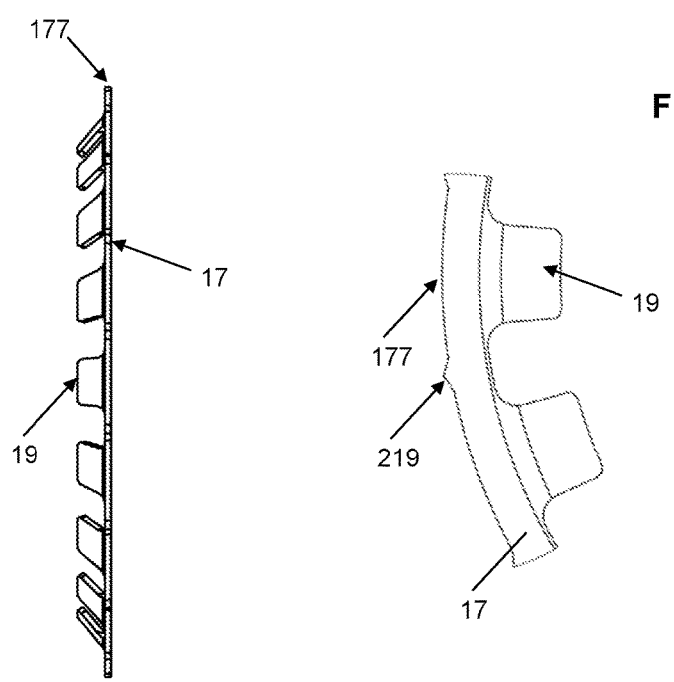
FIG. 19 is a front view of the fastening ring of FIG. 18.
Figure 20:
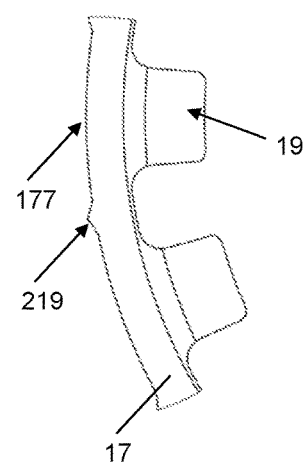
FIG. 20 is an enlarged view of the portion of the fastening ring taken from encircled portion 20-20 of FIG. 19.

The fastening ring 21 can comprise a spring steel formulation, for example, that enables the fastening ring to be malformed during installation, while springing back into its originally manufactured position once installed. The fastening ring is capable of grabbing an inserted pipe's surface via two or more teeth 19 to ensure connections cannot be pulled apart. As shown in FIGS. 18 through 20, the fastening ring 21 includes a substantially cylindrical base 17 that has a plurality of bifurcated or square edged teeth 19 extending radially inwardly from and along the base 17. The teeth 19 of the fastening ring 21 can extend at various angles from the base axis as measured when the teeth are at rest position and are not stressed by the insertion of a pipe, for example. The number of teeth can readily vary in number and size. In various embodiments, the fastening ring teeth 19 are angled radially and axially inwardly from the substantially cylindrical perimeter of the ring 17, toward the axially inner portion 32 and away from the axially external portion 36 of the fitting body member 12, such that when a pipe is inserted, the teeth exert a pressure against the pipe to discourage the pipe from slipping or moving back out of the fitting. In various embodiments, the radially outer edge 177 of the ring 21 includes radially outwardly extending nubs 219 for facilitating a snug and rotation-resistant engagement with the fitting interior 13.

Figure 15:
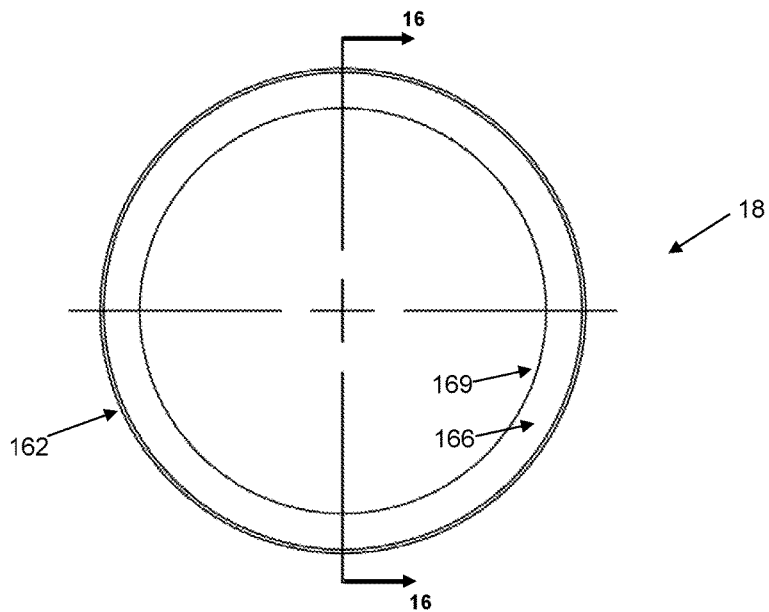
FIG. 15 is a right side view of a spacer gland in accordance with embodiments of the present invention.
Figure 16:
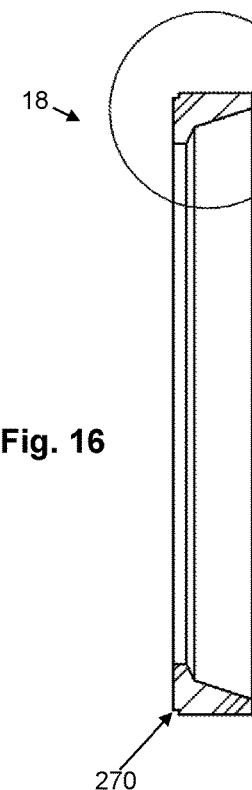
FIG. 16 is a cross-sectional view of the spacer gland as taken along line 14-14 of FIG. 15.
Figure 17:
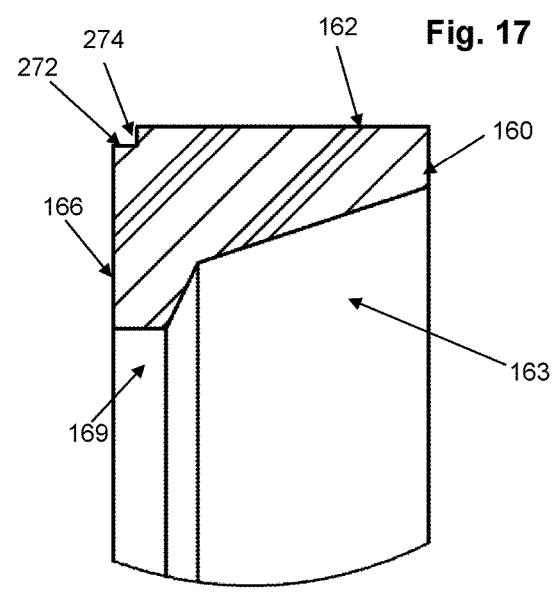
FIG. 17 is an enlarged view of the portion of the spacer gland taken from encircled portion 17-17 of FIG. 16.

As shown in FIGS. 15 through 17, the sealing ring support member 18 has a circumferential base 162, an axially inner edge 166 that acts as a sealing member-engaging surface and an axially outer edge 160 that acts as a fastening ring-engaging surface. The sealing ring support member 18 can also include a notch 270 formed by a wall portion 272 extending axially inwardly of edge 166, and a wall portion 274 extending radially inwardly of base 162. Notch 270 provides a support surface for the sealing ring support member 18 to securely engage the radial step 43 of the interior surface 13 of the fitting body member 12. The sealing ring support member 18 further includes a radially inner surface 169 for engaging an inserted tube 25 during operation. The sealing ring support member 18 can be comprised of metal or plastic, for example. The fastening ring 21 and sealing ring support member 18 can be split, in various embodiments of the present invention. Such split arrangements for the sealing ring support member and fastening ring are shown and described, for example, in U.S. Pat. No. 9,068,680, the disclosure of which is hereby incorporated by reference.

Figure 21:
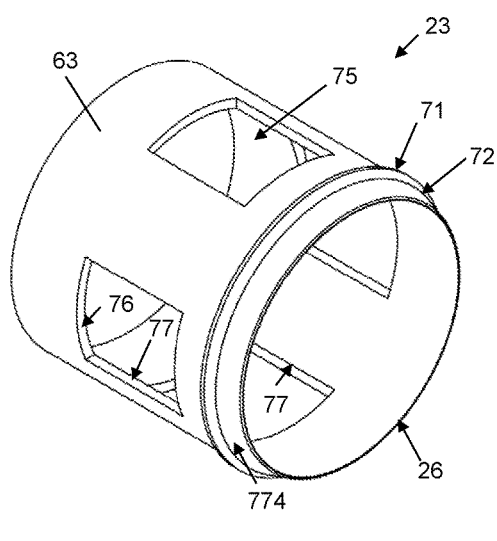
FIG. 21 is a perspective view of a release pusher in accordance with embodiments of the present invention.
Figure 22:
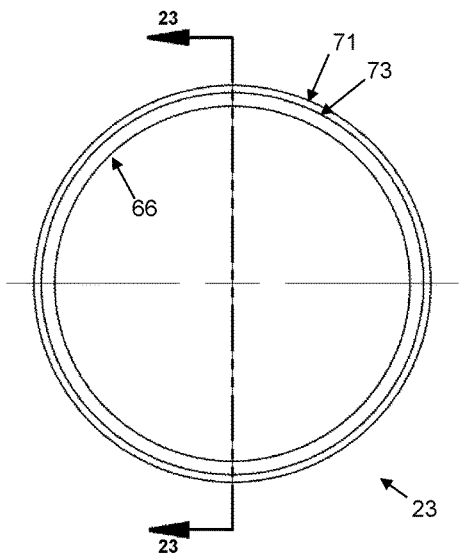
FIG. 22 is a right side view of the release pusher of FIG. 21.
Figure 23:
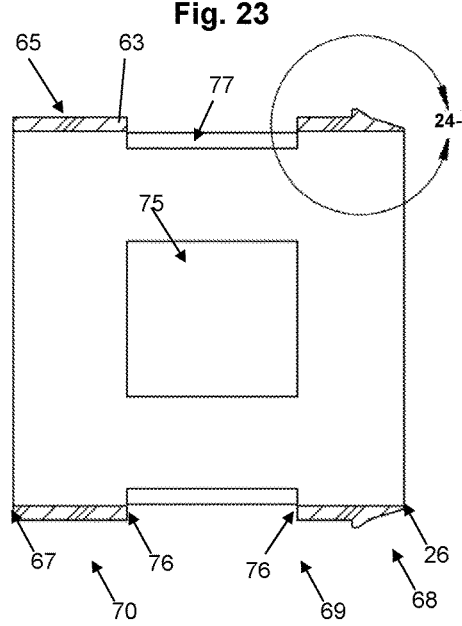
FIG. 23 is a front cross-sectional view of the release pusher of FIG. 21.
Figure 24:
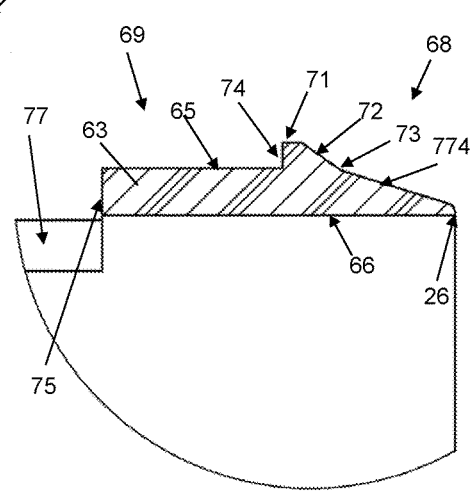
FIG. 24 is an enlarged view of the portion of the release pusher taken from encircled portion 24-24 of FIG. 23.

As shown in FIGS. 21 through 24, for example, the release pusher 23 is substantially cylindrical and includes a wall 63 having an outer surface 65, an inner surface 66, a back edge 67 and a leading tip 26. In various embodiments, the wall 63 comprises a leading segment 68, a middle segment 69 and a trailing segment 70. In various embodiments of the release pusher 23 of the present invention, the leading segment 68 comprises a single linear segment from a radially outer ledge 71 to the leading tip 26. In various other embodiments, as shown in FIG. 24, a first leading outer wall segment 72 extends linearly at a first angle from the radially outer ledge 71 to a leading outer wall intermediate point 73, and a second leading outer wall segment 774 extends linearly from the outer wall intermediate point 73 to the leading tip 26 at a second angle. As shown in FIG. 21, when viewed in three dimensions, segment 72 and segment 774 are substantially frustoconical in shape. In various embodiments, the release pusher wall middle segment 69 is formed radially inwardly of the radially outer ledge 71, with an outer ledge back wall 74 extending from the outer ledge 71 to the middle segment 69. The trailing segment 70 includes a back edge 67 which can be pushed to axially move the release pusher 23 during operation, so as to move the tip 26 forward and influence the fastening ring teeth 19 to permit insertion and/or removal of a pipe 25. In various embodiments, the release pusher wall 63 is formed with one or more cavities 75 bounded by radial walls 76 and axial walls 77. The walls 76, 77 are contacted by the shoe member 24 during operation, whereby the shoe member 24 can resist and/or prevent rotation of the release pusher 23, as described elsewhere herein. In various embodiments, as shown in FIGS. 28, 29 and 33 through 41, shoe member 224 with anti-rotational jaw members 240 are employed and can be in contact with the walls (e.g., 77) of the release pusher 23.

The release pusher 23 can comprise a single-piece, injection-molded plastic material or a metal material such as brass, for example. When pressure is applied on the back edge 67 of the release pusher 23, the leading tip 26 can engage the inside surface of the fastening ring teeth 19, and the outer ledge back wall 74 can removably engage a retaining lip 111 of the retaining ring 22. As the release pusher 23 is inserted into the fitting 12, the radially outer ledge 71 is crimped somewhat as it slides along the axially outer wall segment 113 of the retaining ring 22. The middle segment 69 provides sufficient resilience to allow the outer ledge 71 to flex backwardly and away from tip 26 as the release pusher is inserted into the fitting. Once the outer ledge 71 passes the retaining lip 111 of the retaining ring, the outer ledge 71 expands such that the outer ledge back wall 74 lies in substantially flush engagement with the retaining lip 111 and the outer ledge 71 lies in substantially flush engagement with the axially inner wall segment 112 of the retaining ring 22. In this way, the release pusher 23 is held in place against the retaining ring 22 within the fitting body member 12, as shown in FIGS. 5 and 6.

The trailing segment 70 of the release pusher 23 is slidably engaged with the axially outer wall segment 113 once the release pusher 23 is inserted, and this slidable engagement assists the release pusher 23 in traveling substantially along the axis 325 of the fitting during operation. During removal, a tool such as a specially adapted wrench, for example, can be applied to the outer top surface of the release pusher so as to exert a pushing and lifting force that causes the release pusher outer ledge 71 to disengage the retaining lip 111. Once the release pusher is removed, the internal packing arrangement components are exposed for removal and/or replacement as necessary or desired.

FIGS. 11 through 14 illustrate embodiments of the nut connector 27 of the present invention. As shown therein, nut connector 27 is somewhat cylindrical with an axially extending wall 130 integrally formed with a radially extending end wall 132, and an opening 133 extending axially therethrough. The axially extending wall 130 has an interior surface 134 and an exterior surface 136, wherein the interior surface 134 can include a thread 135 for engaging a thread 64 on the exterior wall 55 of the axially outer portion 36 of the fitting body member 12. The axially extending wall 130 terminates in a termination edge 191, as shown in FIGS. 12 and 14. The exterior surface 136 can include extended portions 138 and indented portions 139 to facilitate hand gripping of the connector 27 during operation. The radially extending wall 132 includes an interior surface 192, an exterior surface 194 and a circumferential edge 195. As shown in FIG. 14, the radial distance R10 from the axis AA of the nut connector 27 to the interior surface 134 of the axially extending wall 130 is larger than the radial distance R9 from the axis AA of the nut connector 27 to the circumferential edge 195 of the radially extending wall 132. As further shown in FIG. 14, the nut connector 27 includes an angled wedge surface 197 integrally formed with the axially 130 and radially 132 extending walls. The wedge surface 197 provides a suitable surface to engage the shoe member 24 during operation of various embodiments of the device.

Figure 25:
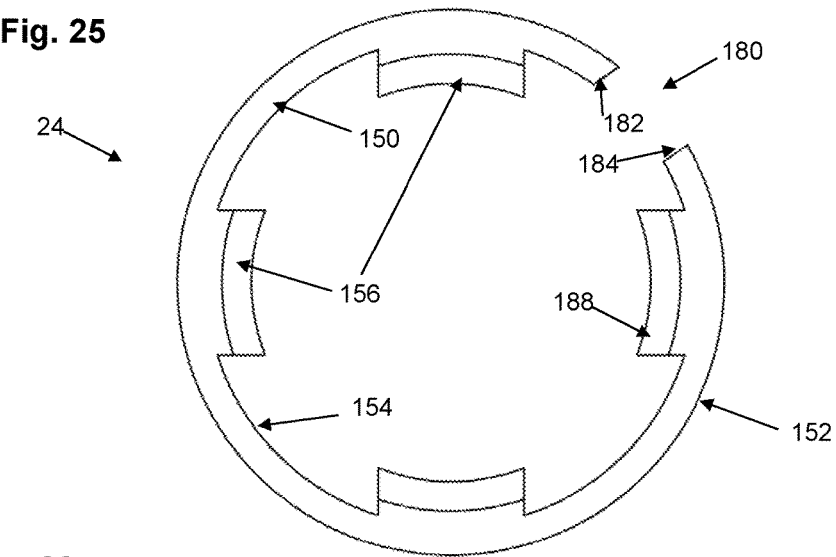
FIG. 25 is a right side view of a lock washer in accordance with embodiments of the present invention.
Figure 26:
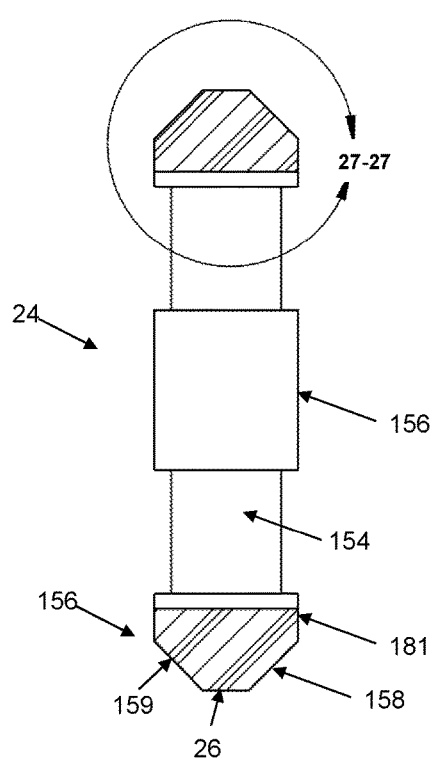
FIG. 26 is a front view of the lock washer of FIG. 25.
Figure 27:
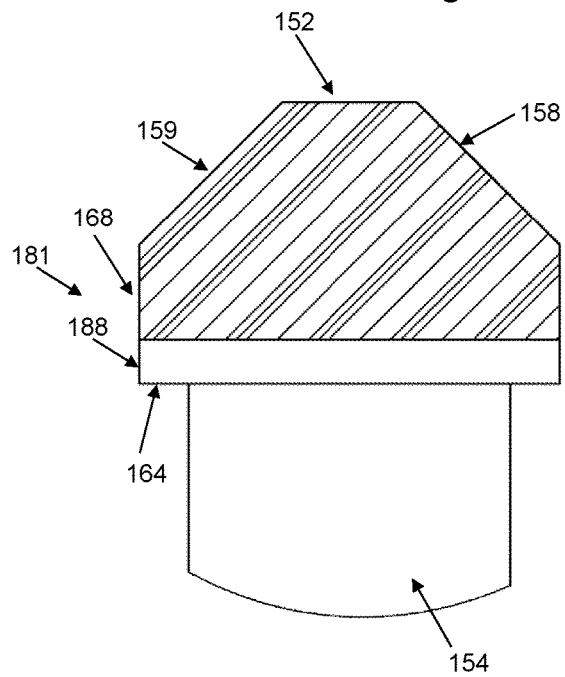
FIG. 27 is an enlarged view of the portion of the lock washer taken from encircled portion 27-27 of FIG. 26.

FIGS. 25 through 27 illustrate an embodiment of a shoe member 24. As shown therein, shoe member 24 is substantially ring-shaped and includes a body 150 having an exterior surface 152 and an interior surface 154. One or more notches 156 extend radially inwardly from the interior surface 154 of the body 150, and each notch 156 is adapted to engage a respective cavity 75 in the release pusher 23, so as to be capable of engaging the outer surface of an inserted pipe 25 and facilitating resistance to rotation of the inserted pipe. In various embodiments, there are four notches 156 around the perimeter of the interior surface 154, and four cavities 75 in the release pusher 23. As shown in FIGS. 25 through 27, the shoe member 24 can be formed with side surfaces 158, 159 extending axially outwardly and radially inwardly from the exterior surface 152. In one embodiment, the side surfaces 158, 159 extend at an approximately forty-five degree angle from the exterior surface 152. In areas of the shoe member 24 containing a notch 156, the side surfaces 158, 159 extend from the exterior surface 152 to notch edges 181, which extend radially inwardly to a notch interior surface 164. As shown in FIGS. 5, 6, 25 and 27, the radially innermost portion 188 of each notch edge 181 is adapted to engage the release pusher 23, whereas the intermediate portion 168 of each notch edge 181 is adapted to engage the axially outer edge 83 of the retaining ring 22 on a first side and the interior surface 192 of the radially extending wall 132 of the nut connector 27 on the second side. Further, as shown in FIGS. 5 and 6, side surface 158 is adapted to engage the angled wedge surface 197 of the nut connector 27 and side surface 159 is adapted to engage the radially inner edge 139 of the axially outer rim 138 of the fitting body member 12. In various embodiments of the present invention, the shoe member 24 can comprise a metal or plastic component having suitable resiliency and structural memory, and can be provided as a unitary, unsplit member or can be provided with a split similar to the embodiment of the fastening ring described elsewhere herein. For example, as shown in FIG. 25, shoe member 24 is formed with a split 180 exposing first 182 and second 184 opposing circumferential end edges. In various embodiments, the split nature of the shoe member 24 allows the shoe member 24 to compress during tightening engagement of the retaining nut 27 with the center body connector 12, effectively narrowing the split. As the retaining nut 27 is loosened, the shoe member 24 expands and re-forms back into its relaxed, original state, reducing the compression of the packing arrangement on the inserted pipe 25.

It will be appreciated that the combination, or portions thereof, of the fastening ring 21, the sealing ring(s) 14, 16, the sealing ring support member 18, the retaining ring 22, release pusher 23, shoe 24 and retaining nut 27 provide a push-fit piping assembly when joined with the pipe fitting 12 in accordance with embodiments of the present invention.

FIGS. 28 and 29 illustrate an alternative embodiment of a shoe member 224. As shown therein, shoe member 224 is substantially ring-shaped and includes a body 250 having an exterior surface 252 and an interior surface 254. One or more notches 256 extend radially inwardly from the interior surface 254 of the body 250, and each notch 256 is adapted to engage a respective cavity 75 in the release pusher 23, so as to be capable of engaging the outer surface of an inserted pipe 25 and facilitating resistance to rotation of the inserted pipe. In various embodiments, there are four notches 156 around the perimeter of the interior surface 154, and four cavities 75 in the release pusher 23. As shown in FIGS. 28 and 29, the shoe member 224 can be formed with side surfaces 258, 259 extending axially outwardly and radially inwardly from the exterior surface 252. In one embodiment, the side surfaces 258, 259 extend at an approximately forty-five degree angle from the exterior surface 252. In areas of the shoe member 224 containing a notch 256, the side surfaces 258, 259 extend from the exterior surface 252 to notch edges 261, which extend radially inwardly to a notch interior surface 264. In various embodiments, the radially innermost portion 288 of each notch edge 281 is adapted to engage the release pusher 23, whereas the intermediate portion 268 of each notch edge 281 is adapted to engage the axially outer edge 83 of the retaining ring 22 on a first side and the interior surface 192 of the radially extending wall 132 of the nut connector 27 on the second side. Further, side surface 258 is adapted to engage the angled wedge surface 197 of the nut connector 27 and side surface 259 is adapted to engage the radially inner edge 139 of the axially outer rim 138 of the fitting body member 12, in a similar manner to that shown in FIGS. 5 and 6 in connection with shoe member 24. In various embodiments of the present invention, the shoe member 224 can comprise a metal or plastic component, and can be provided as a unitary, unsplit member or can be provided with a split similar to the embodiment of the fastening ring described elsewhere herein. For example, as shown in FIG. 28, shoe member 224 is formed with a split 280 exposing first 282 and second 284 opposing circumferential end edges. In various embodiments, the split nature of the shoe member 24 allows the shoe member 24 to compress during tightening engagement of the retaining nut 27 with the center body connector 12, effectively narrowing the split. As the retaining nut 27 is loosened, the shoe member 24 expands and re-forms back into its relaxed, original state, reducing the compression of the packing arrangement on the inserted pipe 25.

As further shown in FIGS. 28 and 29 and in various embodiments, one or more of the notches 256 is provided with a slot 255 formed in the radially interior surface 264. The slot 255 can be formed with a bottom wall 293, end wall 292 and side walls 290, 291. In various embodiments, the bottom wall has a width W that is wider than the width of the radially innermost portion of the slot (between side wall edges 297 and 299). In this way, the slot 255 is adapted to receive and retain a respective anti-rotational jaw member 240 as shown in FIGS. 33 through 36, 39 and 41. Further, in various embodiments, the slot can extend axially a length L that is less than the full axial length A of the notch interior surface 264. In this way, end wall 292 can act to restrict axial movement of the anti-rotational jaw member 240 as it is employed against the inserted piping element as described elsewhere herein. In various embodiments, slot extends axially the full length A of the notch interior surface 264.

As shown in FIGS. 33 through 36, an anti-rotational jaw member 240 is provided as a single-piece member having a base 241, side walls 243 and an arcuate top face 242. The curvature of the top face 242 is provided so as to align with an inserted pipe element during operation. The side walls 243 include an upper segment 245 extend radially downwardly to a middle edge 246, and a lower segment 244 extending outwardly from the middle edge 246 to the base 241 such that the width B of the lower segment 244 is narrowest at middle edge 246 and the width C of the lower segment is widest at base 241. In this way, jaw member 240 can be securely retained within the slot 255 of the shoe member 224. In various embodiments, the jaw member 240 is formed of a metal material, and the upper segment 245 extends radially inwardly further than radially interior surface 264 of the shoe member 224. The jaw member 240 can be positioned within a respective cavity 75 in the release pusher 23 during operation, and if the shoe member 224 is rotated, the jaw member 240 can facilitate rotation stopping upon reaching wall 77 of release pusher 23.

During production of a fitting with packing arrangement therein, the fitting body member 12 of the present invention is provided and one or more sealing members 14, 16 are inserted into the axially intermediate portion 34 of the fitting body member 12 and retained against the first interior wall portion 44A thereof. Next, the sealing ring support member 18 is inserted so as to fit snugly within the axially intermediate portion 34 of the fitting body member 12, as notch 270 engages radial step 43 such that support member base 162 is retained against second 44B interior wall portion of fitting body member 12. The support member 18 abuts the sealing ring member 16, as shown in FIGS. 5 and 6, for example. As further shown therein, the fastening ring 21 is then inserted such that its radially outer edge 177 is securely retained against the second interior wall portion 44B of the axially intermediate portion 34 of the fitting body 12, and the base 17 is further securely retained between the sealing ring support member 18 and the retaining ring 22. The retaining ring 22 is inserted so as to be retained in the axially outer portion 36 and the second interior wall portion 44B of the axially intermediate portion 34 of the fitting body member 12. The release pusher 23 is then inserted as described above. The nut connector 27 and shoe member 24 can then be incorporated by securing the shoe member 24 between the axially outer rim of the fitting body member and the nut connector, such that the one or more notches 156 engage a respective cavity 75 in the release pusher 23. According to various embodiments, and as shown in FIGS. 5 and 6, the first side surface 158 of shoe member 24 is adapted to engage the angled wedge surface 197 of the nut connector 27 and the second side surface 159 is adapted to engage the radially inner edge 139 of the axially outer rim 138 of the fitting body member 12. In various alternative embodiments, shoe member 224 is employed with anti-rotational jaw members 240, instead of shoe member 24, as shown in FIGS. 37 through 41.

Figure 37:
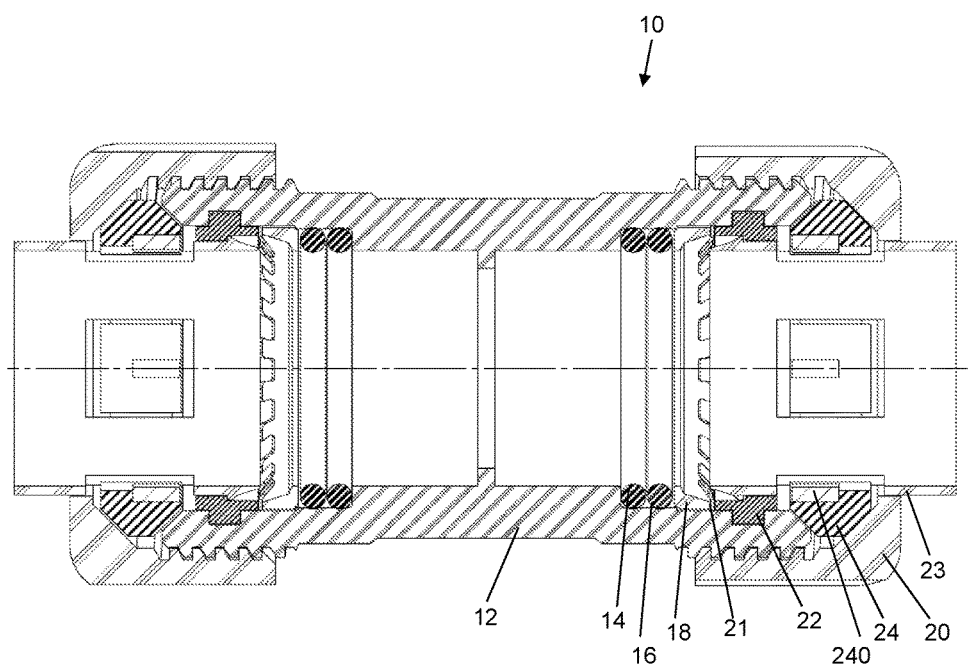
FIG. 37 is a front cross-sectional view of one embodiment of the device of the present invention.
Figure 38:
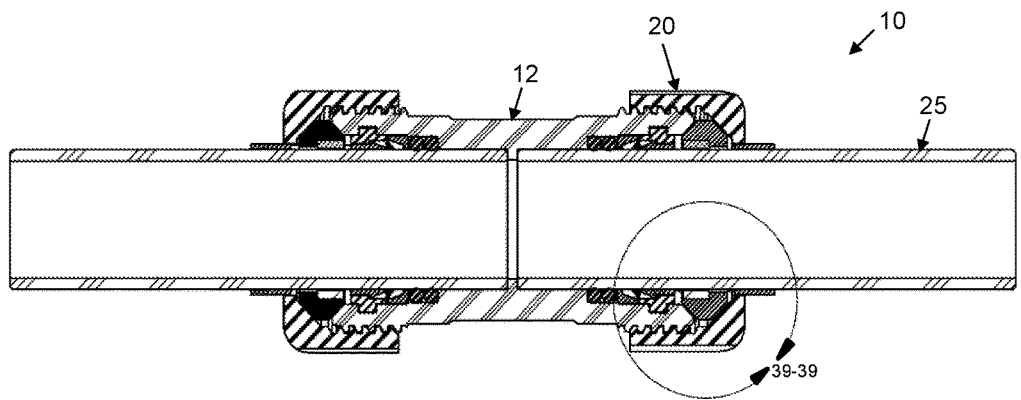
FIG. 38 is a front cross-sectional view of one embodiment of the device of the present invention.
Figure 39:
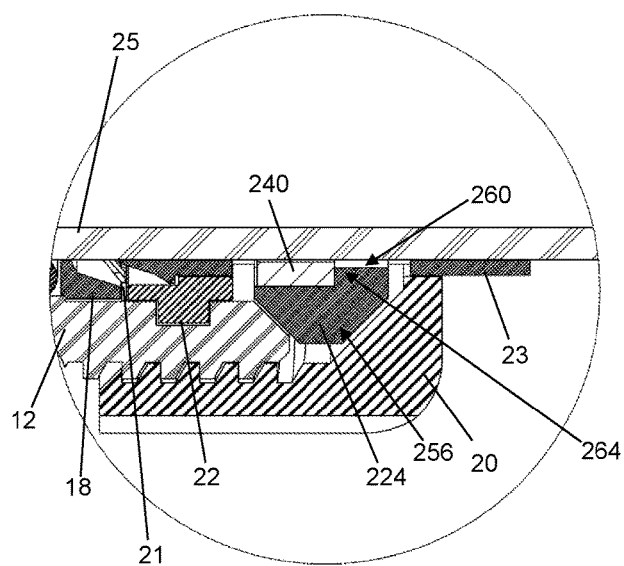
FIG. 39 is an enlarged view of the portion of the device taken from encircled portion 39-39 of FIG. 38.
Figure 40:
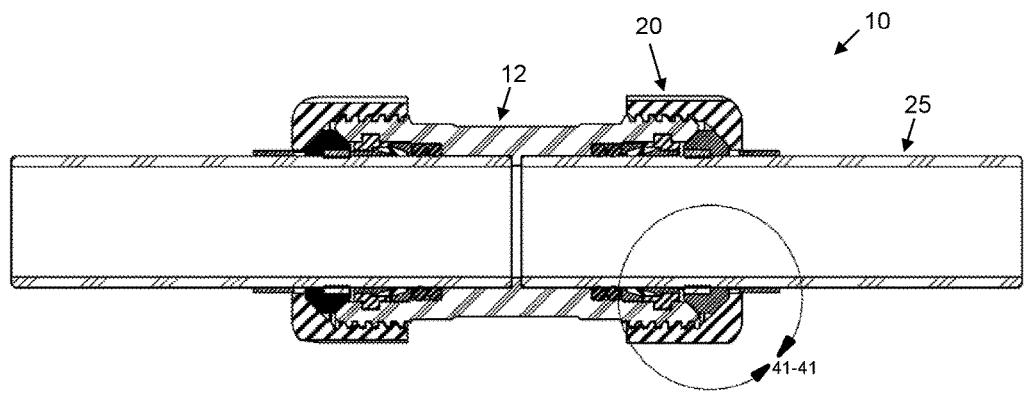
FIG. 40 is a front cross-sectional view of one embodiment of the device of the present invention.
Figure 41:
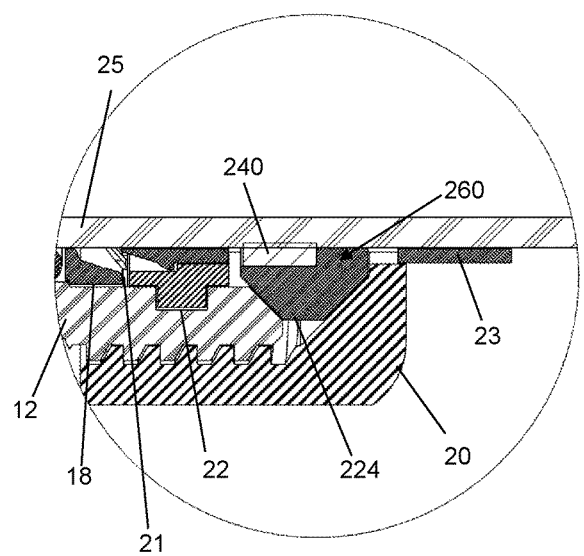
FIG. 41 is an enlarged view of the portion of the device taken from encircled portion 41-41 of FIG. 40.

Upon initial tightening rotation of the nut connector 27, the thread 64 of the fitting body member 12 engages the thread 135 of the nut connector 27. At such time, and as shown in FIG. 6, there is a gap 355 formed between the notch edge 181 of the shoe member 24 and the interior surface 192 of the radially extending wall 132 of the nut connector 27. This gap 355 is also present between the first side surface 158 and angled wedge surface 197, as well as between the release pusher 23 and the notch edge 181 of the shoe member 24, as the notch edge 181 is partially engaged with the cavity 75 of the release pusher 23. There is further a gap 357 present between the notch edge 181 and the retaining ring 22, between the notch edge 181 and the cavity radial wall 76 of the release pusher 23, and between the side surface 159 of the shoe member 24 and the radially inner edge 139 of the axially outer rim of the fitting body member 12. As can be seen in FIG. 6, these gaps 355 and 357 are more prevalent when the nut connector 27 and body member 12 have not been fully tightened, as noted by the relative positioning of threads 64 and 135 as indicated at 359. In a similar fashion, when shoe member 224 is employed with anti-rotational jaws 240, as shown in FIGS. 37 through 39, a gap 260 exists between inner surface 264 of the notches 256 of the shoe member 224 and the inserted pipe 25. However, there is less of a gap or even no gap between the anti-rotational jaw member(s) 240 and the pipe 25, as the jaw members 240 extend radially inwardly further than the notch inner surface(s) 264 as described elsewhere herein.

Upon further tightening of nut connector 27 with fitting body member 12, as shown in FIG. 5, the shoe member 24 is more firmly engaged with the nut connector 27 and body member 12, as the first side surface 158 of shoe member 24 engages the angled wedge surface 197 of the nut connector 27 and the second side surface 159 engages the radially inner edge 139 of the axially outer rim of the fitting body member 12. It will be appreciated that gaps 355 and 357 are still present when the nut connector 27, shoe member 24 and fitting body member 12 are so secured, but such gaps are desirable in order to permit release pusher 23 to move axially in both directions in order to engage and disengage the fastening ring teeth 19 when piping elements are being inserted and removed. Nevertheless, as shown in FIG. 5, the notch interior surface 164 of the shoe member 24 engages the inserted piping element 25 when the nut connector, shoe member 24 and fitting body member 12 are so engaged. As further shown in FIG. 5, the release pusher 23 is movable axially so as to form a gap 363 between the ledge back wall 74 and the retaining ring 22. Similarly, as the nut connector 27 and body member 12 are secured further together in the embodiment shown in FIGS. 40 and 41, the gap 260 (see FIG. 39) is significantly reduced, and the anti-rotational jaws 240 more securely engage the inserted pipe 25.

When a pipe 25 is inserted, it travels through the axial openings in the nut connector 27, the release pusher 23, the shoe member 24, the retaining ring 22, the fastening ring 21, the sealing ring support member 18 and the sealing member(s) 14, 16 into the pipe receiving cavity 330 of the fitting body member 12. It will be appreciated that the release pusher 23 can be extended axially forward prior to insertion of a pipe to force the fastening ring teeth 19 axially inwardly and downward to provide sufficient clearance for the inserted pipe. When the pipe is fully inserted (i.e., when the leading edge of the pipe contacts tube stop 29), the release pusher 23 can be released and returned to its relaxed and engaged position with the retaining lip 111 of the retaining ring 22. In this position, the teeth 19 of the fastening ring 21 engage the side walls of the inserted pipe in order to retain the pipe securely within the fitting body member 12. The sealing members provide a strong, leak-free seal and the combination of the sealing ring support member 18, the fastening ring 21 and the retaining ring 22 prohibits any inclination an inserted pipe may have to slide out of position. The shoe member 24 also assists in retention of the pipe 25, as well as with preventing rotation of the pipe or surrounding components, as the notch(es) of the shoe member firmly engage the one or more cavities 75 in the release pusher 23. In the embodiment shown in FIGS. 37 through 41, shoe member 224 acts similarly to shoe member 24 of FIGS. 5 and 6; however, the anti-rotational jaws 240 act as teeth to further secure the inserted pipe and prevent its rotation.

It will be appreciated that multiple pipes 25 can be inserted and retained using the single fitting body member 12, as shown in FIGS. 1 through 4, for example. Among other things, the assembly of the embodiments of the present invention prevents rotation of the fitting about an inserted tube. It will further be appreciated that, in various embodiments of the present invention, the members of the push connect joint assembly are formed through hydroforming processes. It will be appreciated that any and all dimensions described herein are exemplary and provided as embodiments associated with proper working operation of the present invention.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A hybrid push-to-connect fitting, comprising:
   a fitting body member having an interior wall, an exterior wall and an axially outer rim, wherein the interior wall defines an internal cavity extending through the fitting along an internal axis;
   at least one packing arrangement comprising a release pusher maintained within the internal cavity of the fitting body member, wherein the release pusher comprises a wall having inner and outer surfaces, with at least one cavity formed in the wall;
   a nut connector threadably securable to the exterior wall of the fitting, with the nut connector having a radially extending end wall; and
   a single body shoe member secured between the axially outer rim of the fitting body member and the nut connector radially extending end wall, wherein the single body shoe member comprises a split body having exterior and interior surfaces, and further comprises at least one notch extending radially inwardly from the body interior surface, wherein the single body shoe member is compressible between the fitting body member and the nut connector so that the at least one notch extends into the at least one cavity formed in the wall of the release pusher.

2. The fitting of claim 1, wherein the axially outer rim of the fitting body member includes a sloped radially inner edge extending axially and radially outwardly from an axially inner edge to an axially outer edge, and wherein the nut connector includes an axially extending wall and an angled wedge surface integrally formed with the axially extending wall and the radially extending end wall.

3. The fitting of claim 2, wherein the shoe member is formed with first and second side surfaces extending axially outwardly and radially inwardly from the exterior surface thereof, such that the first side surface engages the sloped radially inner edge of the axially outer rim of the fitting body member, and the second side surface engages the angled wedge surface of the nut connector.

4. The fitting of claim 1, wherein the at least one packing arrangement further comprises at least one sealing ring, a fastening ring, and a retaining ring.

5. The fitting of claim 4, wherein the retaining ring is split.

6. The fitting of claim 1, wherein the at least one notch is formed with a slot, and further including an anti-rotational jaw member positioned within the slot.

7. A hybrid push-to-connect fitting, comprising:
a fitting having an interior wall and an exterior wall, wherein the interior wall defines a cavity extending through the fitting along an internal axis and includes first and second segments separated by a tube stop element extending radially into the cavity from the interior wall, wherein each of the first and second segments includes a respective axially outer rim;
a first packing arrangement inserted into the cavity so as to engage the interior wall of the first segment of the fitting;
a second packing arrangement inserted into the cavity so as to engage the interior wall of the second segment of the fitting;
a first nut connector threadably securable to the exterior wall of the first segment of the fitting, with the first nut connector having a radially extending end wall; and
a first shoe member secured between the axially outer rim of the first segment of the fitting body member and the first nut connector radially extending end wall.

8. The fitting of claim 7, further including a second nut connector threadably securable to the exterior wall of the second segment of the fitting, with the second nut connector having a radially extending end wall, and a second shoe member secured between the axially outer rim of the second segment of the fitting body member and the second nut connector radially extending end wall.

9. The fitting of claim 7, wherein the first shoe member includes a body having exterior and interior surfaces, and further includes at least one notch extending radially inwardly from the body interior surface.

10. The fitting of claim 9, wherein the at least one notch is formed with a slot, and further including an anti-rotational jaw member positioned within the slot.

* * * * *